US012547850B2

(12) United States Patent
Shi et al.

(10) Patent No.: US 12,547,850 B2
(45) Date of Patent: Feb. 10, 2026

(54) METHOD AND SYSTEM FOR AUTOMATIC GENERATION OF CONVERSATION SAMPLES FOR MACHINE LEARNING DIALOGUE MANAGEMENT

(71) Applicant: JPMorgan Chase Bank, N.A., New York, NY (US)

(72) Inventors: Ruibo Shi, London (GB); Agathe Lhérondelle, Sotteville-les-Rouen (FR); Denis Kochedykov, Brooklyn, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 308 days.

(21) Appl. No.: 18/215,517

(22) Filed: Jun. 28, 2023

(65) Prior Publication Data

US 2025/0005304 A1  Jan. 2, 2025

(51) Int. Cl.
*G06F 40/56* (2020.01)
*G06F 40/35* (2020.01)

(52) U.S. Cl.
CPC ............. *G06F 40/56* (2020.01); *G06F 40/35* (2020.01)

(58) Field of Classification Search
CPC ....................................................... G06F 40/56
USPC ............................................................ 704/9
See application file for complete search history.

(56) References Cited

U.S. PATENT DOCUMENTS

| | | | |
|---|---|---|---|
| 8,630,961 B2* | 1/2014 | Beilby | G06N 3/004 706/11 |
| 10,963,493 B1* | 3/2021 | Hu | G05D 1/0016 |
| 2013/0031476 A1* | 1/2013 | Coin | G06F 16/90332 715/706 |
| 2013/0073306 A1* | 3/2013 | Shlain | G06Q 10/06 705/2 |
| 2019/0341039 A1* | 11/2019 | Bharadwaj | G06F 40/30 |
| 2021/0020172 A1* | 1/2021 | Pedemonte | G06F 40/56 |
| 2021/0120206 A1* | 4/2021 | Liu | G06F 40/295 |
| 2022/0292543 A1* | 9/2022 | Henderson | G06Q 30/0252 |

OTHER PUBLICATIONS

A. Tat and M. S. T. Carpendale, "Visualising human dialog," Proceedings Sixth International Conference on Information Visualisation, London, UK, 2002, pp. 16-21, doi: 10.1109/IV.2002.1028751. keywords: {Visualization;Humans;Pattern analysis;Switches;Information retrieval;Rivers;Computer science;Natur (Year: 2022).*

* cited by examiner

*Primary Examiner* — Bharatkumar S Shah
(74) *Attorney, Agent, or Firm* — GREENBLUM & BERNSTEIN, P.L.C.

(57) ABSTRACT

A method and a system for automatic generation of conversation samples for training machine learning-based dialogue managers by using conversation graphs are provided. The method includes: receiving a conversational flow that relates to a conversation; converting the conversational flow into a graphical representation of the conversation; using the graphical representation to determine a set of paths that relate to possible realizations of potential user interactions with respect to the conversation; and generating conversation samples that correspond to the set of paths.

12 Claims, 6 Drawing Sheets

METHOD AND SYSTEM FOR AUTOMATIC GENERATION OF CONVERSATION SAMPLES FOR MACHINE LEARNING DIALOGUE MANAGEMENT

BACKGROUND

1. Field of the Disclosure

This technology generally relates to methods and systems for automatic generation of conversation samples for training machine learning-based dialogue managers by using conversation graphs.

2. Background Information

Training machine learning-based dialogue managers requires a large amount of training examples of conversations. Conventionally, such training examples have been handwritten or generated by other manual means. However, this approach is time consuming and relatively expensive, and it is also prone to errors. As a result, this process is not scalable and not maintainable.

Accordingly, there is a need for a system and a method for automatic generation of conversation samples to be used for training machine learning-based dialogue managers in a high-volume, scalable, maintainable, and efficient manner.

SUMMARY

The present disclosure, through one or more of its various aspects, embodiments, and/or specific features or sub-components, provides, inter alia, various systems, servers, devices, methods, media, programs, and platforms for automatic generation of conversation samples for training machine learning-based dialogue managers by using conversation graphs.

According to an exemplary embodiment, a method for automatic generating conversation samples is provided. The method includes: receiving, by the at least one processor, a first conversational flow that relates to a first conversation; converting, by the at least one processor, the first conversational flow into a first graphical representation of the first conversation; determining, by the at least one processor based on the first graphical representation, a first set of paths that relate to possible realizations of potential user interactions with respect to the first conversation; and generating, by the at least one processor, at least one conversation sample that corresponds to at least one path from within the determined first set of paths.

The determining of the first set of paths may include identifying at least one user intent that corresponds to at least a portion of the first conversational flow.

The determining of the first set of paths may further include determining, for each of the identified at least one user intent, at least one respective slot that corresponds to a possible realization of a potential user interaction.

The generating of the at least one first conversation sample may include retrieving, from a memory that stores historical conversations, at least one conversation segment that corresponds to the at least one respective slot.

The determining of the at least one slot may include determining, for each of the identified at least one user intent, at least two slots and at most twenty slots.

The method may further include validating the at least first one conversation sample by checking a coherency and a logic of the at least one first conversation sample with respect to the first conversation.

The method may further include receiving, from an external source, a set of additional conversation samples for augmenting the at least one first conversation sample.

The method may further include: receiving a second conversational flow that relates to a second conversation; converting the second conversational flow into a second graphical representation of the second conversation; determining, based on the second graphical representation, a second set of paths that relate to possible realizations of potential user interactions with respect to the second conversation; and generating at least one second conversation sample that corresponds to at least one path from within the determined second set of paths.

According to another exemplary embodiment, a computing apparatus for generating conversation samples is provided. The computing apparatus includes a processor; a memory; and a communication interface coupled to each of the processor and the memory. The processor is configured to: receive, via the communication interface, a first conversational flow that relates to a first conversation; convert the first conversational flow into a first graphical representation of the first conversation; determine, based on the first graphical representation, a first set of paths that relate to possible realizations of potential user interactions with respect to the first conversation; and generate at least one conversation sample that corresponds to at least one path from within the determined first set of paths.

The processor may be further configured to identify at least one user intent that corresponds to at least a portion of the first conversational flow.

The processor may be further configured to determine, for each of the identified at least one user intent, at least one respective slot that corresponds to a possible realization of a potential user interaction.

The processor may be further configured to retrieve, from a database that stores historical conversations in the memory, at least one conversation segment that corresponds to the at least one respective slot.

The processor may be further configured to determine, for each of the identified at least one user intent, at least two slots and at most twenty slots.

The processor may be further configured to validate the at least first one conversation sample by checking a coherency and a logic of the at least one first conversation sample with respect to the first conversation.

The processor may be further configured to receive, from an external source via the communication interface, a set of additional conversation samples for augmenting the at least one first conversation sample.

The processor may be further configured to: receive, via the communication interface, a second conversational flow that relates to a second conversation; convert the second conversational flow into a second graphical representation of the second conversation; determine, based on the second graphical representation, a second set of paths that relate to possible realizations of potential user interactions with respect to the second conversation; and generate at least one second conversation sample that corresponds to at least one path from within the determined second set of paths.

According to yet another exemplary embodiment, a non-transitory computer readable storage medium storing instructions for generating conversation samples is provided. The storage medium includes executable code which, when executed by a processor, causes the processor to: receive a first conversational flow that relates to a first conversation; convert the first conversational flow into a first graphical representation of the first conversation; determine, based on the first graphical representation, a first set of paths that relate to possible realizations of potential user interactions with respect to the first conversation; and generate at least one conversation sample that corresponds to at least one path from within the determined first set of paths.

The executable code may be further configured to cause the processor to determine the first set of paths by identifying at least one user intent that corresponds to at least a portion of the first conversational flow.

The executable code may be further configured to cause the processor to determine the first set of paths by determining, for each of the identified at least one user intent, at least one respective slot that corresponds to a possible realization of a potential user interaction.

The executable code may be further configured to cause the processor to generate the at least one first conversation sample by retrieving, from a memory that stores historical conversations, at least one conversation segment that corresponds to the at least one respective slot.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
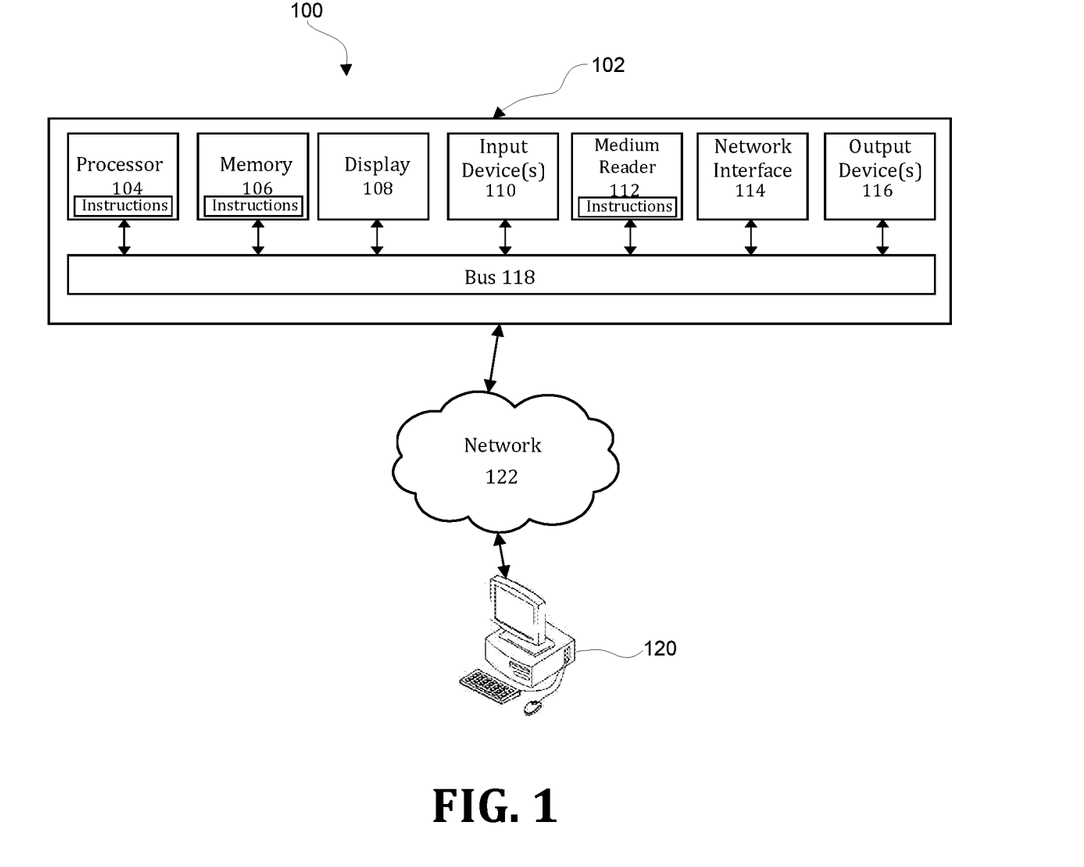
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning system (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a GPS device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized methods and systems for automatic generation of conversation samples for training machine learning-based dialogue managers by using conversation graphs.

Figure 2:
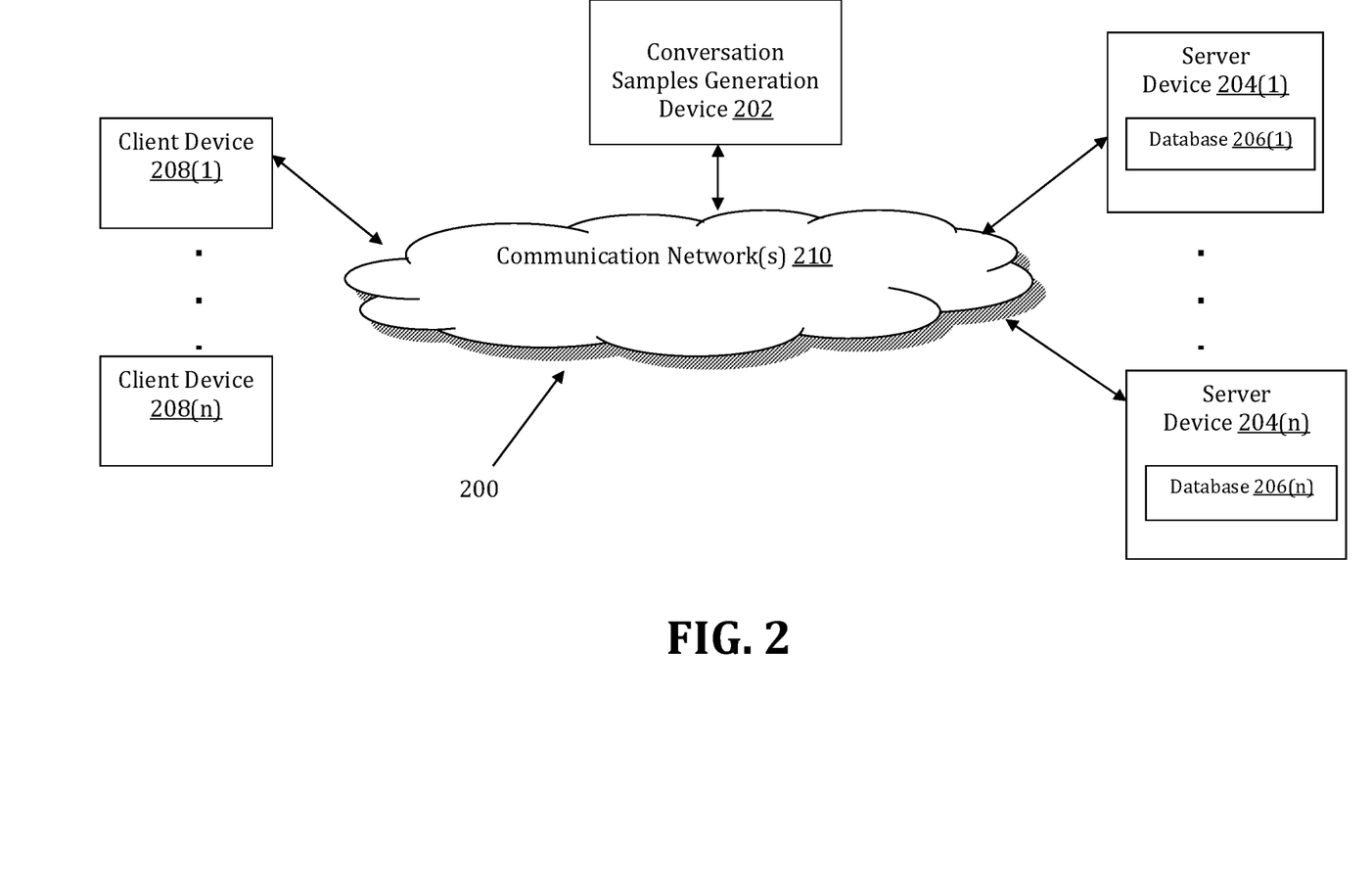
FIG. 2 illustrates an exemplary diagram of a network environment.

Referring to FIG. 2, a schematic of an exemplary network environment 200 for implementing a method for automatic generation of conversation samples for training machine learning-based dialogue managers by using conversation graphs is illustrated. In an exemplary embodiment, the method is executable on any networked computer platform, such as, for example, a personal computer (PC).

The method for automatic generation of conversation samples for training machine learning-based dialogue managers by using conversation graphs may be implemented by a Conversation Samples Generation (CSG) device 202. The CSG device 202 may be the same or similar to the computer system 102 as described with respect to FIG. 1. The CSG device 202 may store one or more applications that can include executable instructions that, when executed by the CSG device 202, cause the CSG device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CSG device 202 itself, may be located in virtual server(s) running in a cloud-based computing environment rather than being tied to one or more specific physical network computing devices. Also, the application(s) may be running in one or more virtual machines (VMs) executing on the CSG device 202. Additionally, in one or more embodiments of this technology, virtual machine(s) running on the CSG device 202 may be managed or supervised by a hypervisor.

In the network environment 200 of FIG. 2, the CSG device 202 is coupled to a plurality of server devices 204(1)-204(n) that hosts a plurality of databases 206(1)-206(n), and also to a plurality of client devices 208(1)-208(n) via communication network(s) 210. A communication interface of the CSG device 202, such as the network interface 114 of the computer system 102 of FIG. 1, operatively couples and communicates between the CSG device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CSG device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and CSG devices that efficiently implement a method for automatic generation of conversation samples for training machine learning-based dialogue managers by using conversation graphs.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CSG device 202 may be a standalone device or integrated with one or more other devices or apparatuses, such as one or more of the server devices 204(1)-204(n), for example. In one particular example, the CSG device 202 may include or be hosted by one of the server devices 204(1)-204(n), and other arrangements are also possible. Moreover, one or more of the devices of the CSG device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the CSG device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store conversation graphs and conversation samples.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the CSG device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the CSG device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the CSG device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the CSG device 202, the server devices 204(1)-204(n), or the client devices 208(1)-208(n), for example, may be configured to operate as virtual instances on the same physical machine. In other words, one or more of the CSG device 202, the server devices 204(1)-204(n), or the client devices 208(1)-208(n) may operate on the same physical device rather than as separate devices communicating through communication network(s) 210. Additionally, there may be more or fewer CSG devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
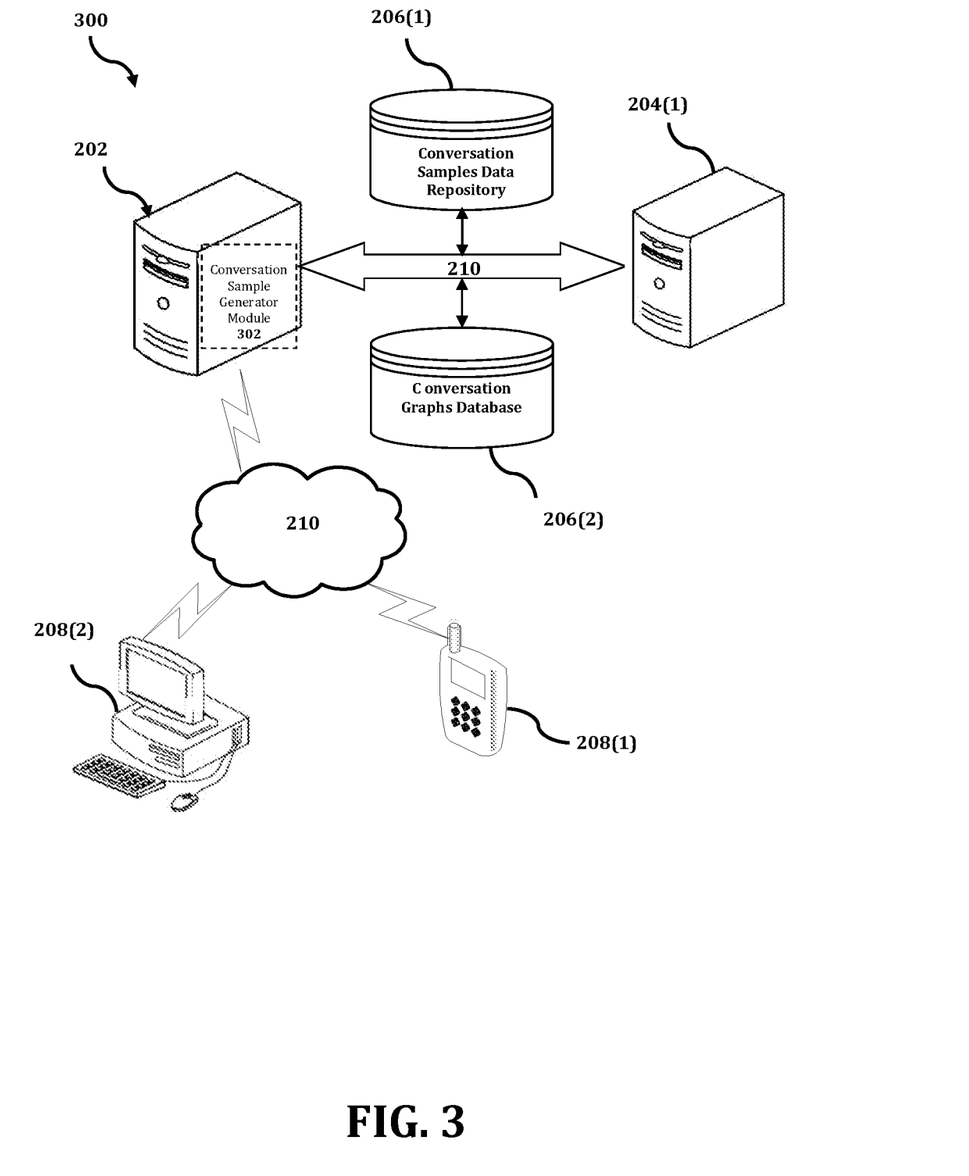
FIG. 3 shows an exemplary system for implementing a method for automatic generation of conversation samples for training machine learning-based dialogue managers by using conversation graphs.

The CSG device 202 is described and shown in FIG. 3 as including a conversation sample generator module 302, although it may include other rules, policies, modules, databases, or applications, for example. As will be described below, the conversation sample generator module 302 is configured to implement a method for automatic generation of conversation samples for training machine learning-based dialogue managers by using conversation graphs in an automated, efficient, scalable, and reliable manner.

An exemplary process 300 for implementing a method for automatic generation of conversation samples for training machine learning-based dialogue managers by using conversation graphs by utilizing the network environment of FIG. 2 is shown as being executed in FIG. 3. Specifically, a first client device 208(1) and a second client device 208(2) are illustrated as being in communication with CSG device 202. In this regard, the first client device 208(1) and the second client device 208(2) may be "clients" of the CSG device 202 and are described herein as such. Nevertheless, it is to be known and understood that the first client device 208(1) and/or the second client device 208(2) need not necessarily be "clients" of the CSG device 202, or any entity described in association therewith herein. Any additional or alternative relationship may exist between either or both of the first client device 208(1) and the second client device 208(2) and the CSG device 202, or no relationship may exist.

Further, CSG device 202 is illustrated as being able to access a conversation samples data repository 206(1) and a conversation graphs database 206(2). The conversation samples generator module 302 may be configured to access these databases for implementing a method for automatic generation of conversation samples for training machine learning-based dialogue managers by using conversation graphs.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the CSG device 202 via broadband or cellular communication. Of course, these embodiments are merely exemplary and are not limiting or exhaustive.

Upon being started, the conversation samples generator module 302 executes a process for automatic generation of conversation samples for training machine learning-based dialogue managers by using conversation graphs. An exemplary process for automatic generation of conversation samples for training machine learning-based dialogue managers by using conversation graphs is generally indicated at flowchart 400 in FIG. 4.

Figure 4:
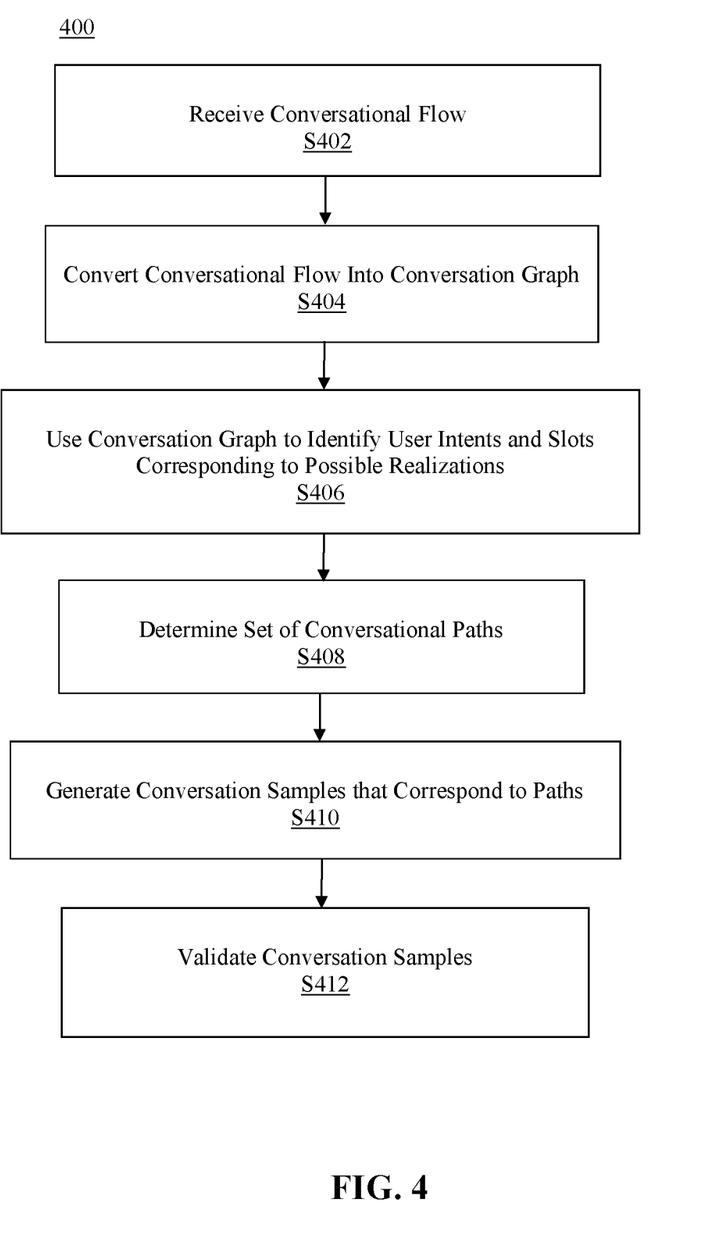
FIG. 4 is a flowchart of an exemplary process for implementing a method for automatic generation of conversation samples for training machine learning-based dialogue managers by using conversation graphs.

In the process 400 of FIG. 4, at step S402, the conversation samples generator module 302 receives a conversational flow that relates to a particular conversation. In an exemplary embodiment, the conversation samples generator module 302 may determine whether the particular conversation corresponds to a corporate conversation that relates to a commercial transaction, or whether instead the particular conversation corresponds to a personal conversation that relates to a non-commercial interaction between two or more individual persons.

At step S404, the conversation samples generator module 302 converts the conversational flow received in step S402 into a graphical representation of the particular conversation, i.e., a conversation graph. In an exemplary embodiment, the conversation graph includes nodes and connectors, and when displayed on a screen, the conversation graph provides a pictorial way for a user to understand and visualize the conversation.

At step S406, the conversation samples generator module 302 uses the conversation graph to identify one or more user intents, and also to identify slots that correspond to possible realizations of the user intents. For example, if a particular node of the conversation graph corresponds to a yes/no question that is asked by one party to the conversation, then two possible user intents for a subsequent node would include responding to the question either in a positive way or in a negative way, possibly in conjunction with an explanation for the positive or negative response. In addition, further to this example, the slots that correspond to the possible realization of the user intents may include a response of "yes" with or without explanation and a response of "no" with or without explanation.

At step S408, the conversation samples generator module 302 uses the identified user intents and the identified slots to determine a set of paths that correspond to possible realizations of potential user interactions within the context of the particular conversation. In this aspect, the number of paths may tend to increase exponentially with the number of identified user intents and/or the number of slots, and therefore, in an exemplary embodiment, there may be limitations placed on these numbers. For example, one possible limitation may be to allow for a minimum of two slots and a maximum of twenty slots per user intent, in order to strike a balance between providing comprehensive coverage of the possible conversation paths and a corresponding computational load that is a function of the number of such paths.

At step S410, the conversation samples generator module 302 generates at least one conversation sample that corresponds to a path from within the set of paths determined in step S408. In an exemplary embodiment, the generation of a conversation sample may be performed by retrieving a conversation sample from a database of historical conversations. In an exemplary embodiment, the generation of a conversation sample may be augmented by obtaining additional conversation samples that are available from an external source.

At step S412, the conversation samples generator module 302 validates the conversation sample generated in step S410 by checking a coherency and a logic of the newly generated sample with respect to the particular conversation. In this aspect, a primary objective is to generate conversation samples that are realistic and natural and appear to replicate the types of words and phrases that would be used by native speakers of the language in a typical conversation, and so the validating step serves the purpose of ensuring that newly generated samples satisfy this objective.

In an exemplary embodiment, the process 400 may be repeated many times by supplying additional conversation flows and generating additional conversation samples, so as to accumulate a large number of conversation samples that would be suitable for use as training data for a machine learning-based dialogue manager. In this aspect, the machine learning-based dialogue manager may act as a chatbot, and the effectiveness of such a chatbot is likely to be strongly impacted by the volume of conversation samples that are used for training thereof.

Figure 5:
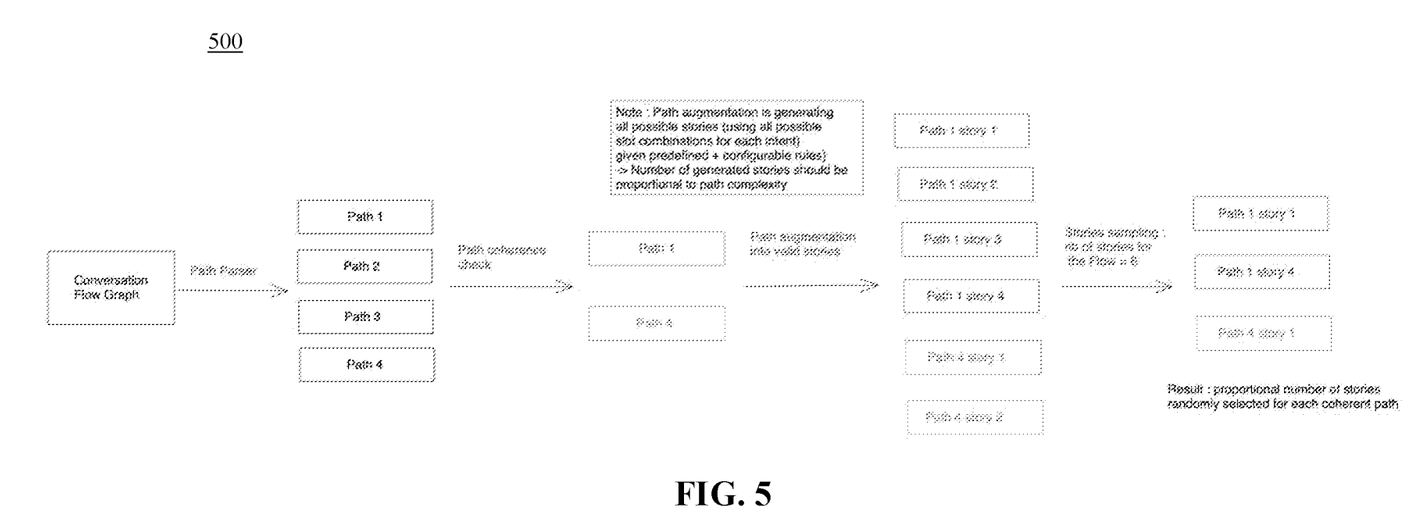
FIG. 5 is an illustration of an example of a conversation flow graph that may be generated during an execution of a method for automatic generation of conversation samples for training machine learning-based dialogue managers by using conversation graphs, according to an exemplary embodiment.

FIG. 5 is an illustration 500 of an example of a conversation flow graph that may be generated during an execution of a method for automatic generation of conversation samples for training machine learning-based dialogue managers by using conversation graphs, according to an exemplary embodiment. In an exemplary embodiment, some designs are of such complexity that the system generates many paths and/or relatively long paths. Furthermore, these paths can handle many slots, and thus, the complexity of the generation of stories is further increased, with so many possible combinations. In such cases, producing exhaustive representation may be impractical, as the stories generation and model training steps may be too long. As a result, a stories sampling mechanism by which the most complex path has the most stories in the final generated stories may be used.

In an exemplary embodiment, the user sets a final global number of stories to be generated for a particular flow. This number is divided among remaining coherent paths depending on their complexity, which is measured by the potential number of stories that could be generated therefrom. For each of these paths, a randomly sampling of stories is then taken.

Figure 6:
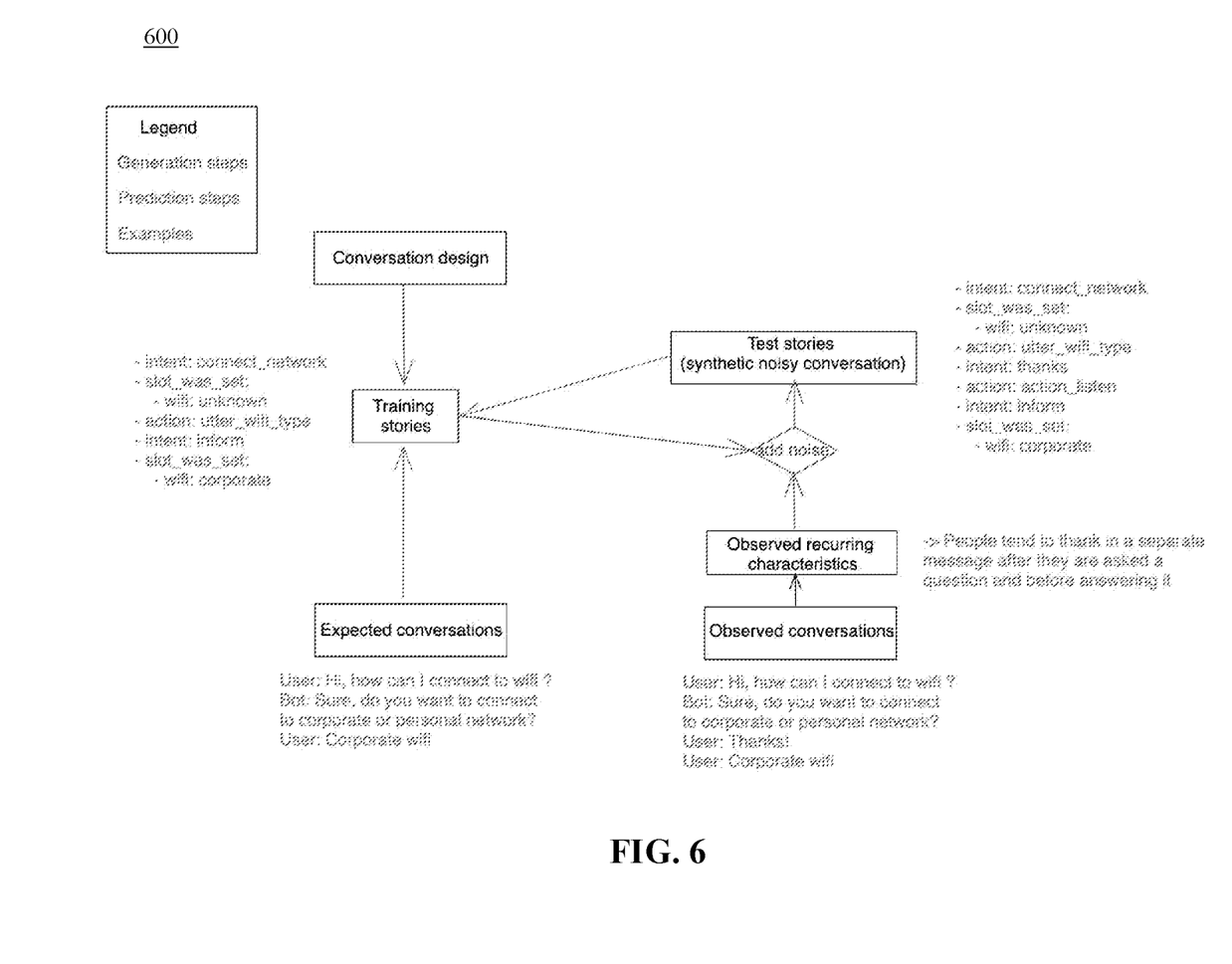
FIG. 6 is an illustration of an example of a conversation test story that includes noise and that may be generated during an execution of a method for automatic generation of conversation samples for training machine learning-based dialogue managers by using conversation graphs, according to an exemplary embodiment.

FIG. 6 is an illustration 600 of an example of a conversation test story that includes noise and that may be generated during an execution of a method for automatic generation of conversation samples for training machine learning-based dialogue managers by using conversation graphs, according to an exemplary embodiment.

Referring to FIG. 6, if a conversation in production can be matched directly to one of the conversation samples that has previously been generated and stored, then it is followed accordingly. However, in many instance, it happens that conversations are noisy while it is still preferable to follow the same path. These conversations will be matched using an ML model trained on the conversation examples that have previously been generated. In this regard, it is important to ensure an ability to match correctly, given known and most common noisy behavior. In an exemplary embodiment, to validate this robustness, noisy conversations called "test stories" are generated and integrated into the system for automation thereof. This noise to be injected into the original stories can be configured by the system user using a configuration file. The example illustrated in FIG. 6 is included as a default in the configuration.

Accordingly, with this technology, an optimized process for automatic generation of conversation samples for training machine learning-based dialogue managers by using conversation graphs is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for generating conversation samples, the method being implemented by at least one processor, the method comprising:
    receiving, by the at least one processor, a first conversational flow that relates to a first conversation;
    converting, by the at least one processor, the first conversational flow into a first graphical representation of the first conversation;
    determining, by the at least one processor based on the first graphical representation, a first set of paths that relate to possible realizations of potential user interactions with respect to the first conversation; and
    generating, by the at least one processor, at least one conversation sample that corresponds to at least one path from within the determined first set of paths,
    wherein the determining of the first set of paths comprises identifying at least one user intent that corresponds to at least a portion of the first conversational flow, and
    wherein the determining of the first set of paths further comprises determining, for each of the identified at least one user intent, at least two respective slots and at most twenty respective slots that correspond to possible realizations of potential user interactions.

2. The method of claim 1, wherein the generating of the at least one first conversation sample comprises retrieving, from a memory that stores historical conversations, at least one conversation segment that corresponds to at least one of the at least two respective slots.

3. The method of claim 1, further comprising validating the at least first one conversation sample by checking a coherency and a logic of the at least one first conversation sample with respect to the first conversation.

4. The method of claim 1, further comprising receiving, from an external source, a set of additional conversation samples for augmenting the at least one first conversation sample.

5. The method of claim 1, further comprising:
    receiving a second conversational flow that relates to a second conversation;
    converting the second conversational flow into a second graphical representation of the second conversation;
    determining, based on the second graphical representation, a second set of paths that relate to possible realizations of potential user interactions with respect to the second conversation; and generating at least one second conversation sample that corresponds to at least one path from within the determined second set of paths.

6. A computing apparatus for generating conversation samples, the computing apparatus comprising:
a processor;
a memory; and
a communication interface coupled to each of the processor and the memory,
wherein the processor is configured to:
receive, via the communication interface, a first conversational flow that relates to a first conversation;
convert the first conversational flow into a first graphical representation of the first conversation;
determine, based on the first graphical representation, a first set of paths that relate to possible realizations of potential user interactions with respect to the first conversation; and
generate at least one conversation sample that corresponds to at least one path from within the determined first set of paths,
wherein the processor is further configured to identify at least one user intent that corresponds to at least a portion of the first conversational flow, and
wherein the processor is further configured to determine, for each of the identified at least one user intent, at least two respective slots and at most twenty respective slots that correspond to possible realizations of potential user interactions.

7. The computing apparatus of claim 6, wherein the processor is further configured to retrieve, from a database that stores historical conversations in the memory, at least one conversation segment that corresponds to at least one of the at least two respective slots.

8. The computing apparatus of claim 6, wherein the processor is further configured to validate the at least first one conversation sample by checking a coherency and a logic of the at least one first conversation sample with respect to the first conversation.

9. The computing apparatus of claim 6, wherein the processor is further configured to receive, from an external source via the communication interface, a set of additional conversation samples for augmenting the at least one first conversation sample.

10. The computing apparatus of claim 6, wherein the processor is further configured to:
receive, via the communication interface, a second conversational flow that relates to a second conversation;
convert the second conversational flow into a second graphical representation of the second conversation;
determine, based on the second graphical representation, a second set of paths that relate to possible realizations of potential user interactions with respect to the second conversation; and
generate at least one second conversation sample that corresponds to at least one path from within the determined second set of paths.

11. A non-transitory computer readable storage medium storing instructions for generating conversation samples, the storage medium comprising executable code which, when executed by a processor, causes the processor to:
receive a first conversational flow that relates to a first conversation;
convert the first conversational flow into a first graphical representation of the first conversation;
determine, based on the first graphical representation, a first set of paths that relate to possible realizations of potential user interactions with respect to the first conversation; and
generate at least one conversation sample that corresponds to at least one path from within the determined first set of paths,
wherein the executable code is further configured to cause the processor to determine the first set of paths by identifying at least one user intent that corresponds to at least a portion of the first conversational flow, and
wherein the executable code is further configured to cause the processor to determine the first set of paths by determining, for each of the identified at least one user intent, at least two respective slots and at most twenty respective slots that correspond to possible realizations of potential user interactions.

12. The storage medium of claim 11, wherein the executable code is further configured to cause the processor to generate the at least one first conversation sample by retrieving, from a memory that stores historical conversations, at least one conversation segment that corresponds to at least one of the at least two respective slots.

* * * * *